(12) United States Patent
LoCascio

(10) Patent No.: US 9,860,946 B2
(45) Date of Patent: Jan. 2, 2018

(54) CIRCUIT TOPOLOGY FOR DRIVING HIGH-VOLTAGE LED SERIES CONNECTED STRINGS

(75) Inventor: James LoCascio, Mountain View, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 1296 days.

(21) Appl. No.: 12/578,424

(22) Filed: Oct. 13, 2009

(65) Prior Publication Data

US 2010/0315572 A1 Dec. 16, 2010

Related U.S. Application Data

(60) Provisional application No. 61/187,100, filed on Jun. 15, 2009.

(51) Int. Cl.
*G09G 3/36* (2006.01)
*H05B 33/08* (2006.01)

(52) U.S. Cl.
CPC ..... *H05B 33/0818* (2013.01); *H05B 33/0824* (2013.01); *Y02B 20/347* (2013.01)

(58) Field of Classification Search
USPC ......................................................... 345/102
See application file for complete search history.

(56) References Cited

U.S. PATENT DOCUMENTS

| | | |
|---|---|---|
| 4,566,134 A | 1/1986 | Harbour et al. |
| 5,384,516 A | 1/1995 | Kawabata et al. |
| 5,736,881 A | 4/1998 | Ortiz |
| 5,767,631 A | 6/1998 | Konopka et al. |
| 5,956,014 A | 2/1999 | Kuriyama et al. |
| 6,392,358 B1 | 5/2002 | Runau et al. |
| 6,697,402 B2 | 2/2004 | Crawford |
| 6,798,372 B1 | 9/2004 | Yang et al. |

(Continued)

FOREIGN PATENT DOCUMENTS

| | | |
|---|---|---|
| CN | 201748245 U | 2/2011 |
| JP | 2005 136157 A | 5/2005 |

(Continued)

OTHER PUBLICATIONS

Non-Final Office Action dated Aug. 30, 2010, U.S. Appl. No. 11/767,400, filed Jun. 22, 2007, Mehmet Nalbant.

(Continued)

*Primary Examiner* — Roy Rabindranath
(74) *Attorney, Agent, or Firm* — North Weber & Baugh LLP

(57) ABSTRACT

A system for backlighting a display uses an open or closed loop and small components that are well suited to high-frequency applications. The system includes multiple LED strings, a high-voltage source, and a low-voltage regulator that has a polarity opposite to that of the high-voltage source. The high-voltage source and the low-voltage regulator provide voltage differences across the LED strings to illuminate them. In one embodiment, the high-voltage source is about 200 VDC, and the low-voltage regulator produces voltages between –2 VDC and –30 VDC. Many types of displays, such as those used on LCD televisions and LCD personal computers, can be backlit in accordance with the embodiments.

33 Claims, 5 Drawing Sheets

(56) References Cited

U.S. PATENT DOCUMENTS

| | | |
|---|---|---|
| 6,807,209 B2 | 10/2004 | Martinez et al. |
| 6,841,947 B2 | 1/2005 | Berg-johansen |
| 6,859,473 B1 | 2/2005 | Tan |
| 6,987,787 B1 | 1/2006 | Mick |
| 7,439,945 B1 | 10/2008 | Awalt et al. |
| 7,545,369 B1 | 6/2009 | Lan et al. |
| 7,675,245 B2* | 3/2010 | Szczeszynski et al. ...... 315/291 |
| 7,847,489 B2* | 12/2010 | Lin ................. 315/291 |
| 7,880,404 B2* | 2/2011 | Deng et al. .................. 315/291 |
| 2003/0016711 A1 | 1/2003 | Crawford |
| 2004/0012556 A1* | 1/2004 | Yong et al. .................. 345/102 |
| 2004/0036990 A1 | 2/2004 | Hanano |
| 2004/0071210 A1 | 4/2004 | Amara et al. |
| 2005/0073263 A1 | 4/2005 | Havlik et al. |
| 2005/0093792 A1* | 5/2005 | Yamamoto et al. ............ 345/83 |
| 2005/0156536 A1 | 7/2005 | Ball |
| 2005/0162098 A1 | 7/2005 | Ball |
| 2005/0174098 A1* | 8/2005 | Watanabe et al. ............ 323/282 |
| 2005/0243022 A1 | 11/2005 | Negru |
| 2007/0164686 A1 | 7/2007 | Ribarich et al. |
| 2007/0195025 A1* | 8/2007 | Korcharz et al. ............... 345/82 |
| 2007/0229446 A1* | 10/2007 | Oh et al. ...................... 345/102 |
| 2007/0257623 A1 | 11/2007 | Johnson et al. |
| 2007/0262724 A1 | 11/2007 | Mednik et al. |
| 2008/0031014 A1 | 2/2008 | Young |
| 2008/0117649 A1 | 5/2008 | Tanaka et al. |
| 2009/0033685 A1 | 2/2009 | Park et al. |
| 2009/0109164 A1* | 4/2009 | Um ............................... 345/102 |

FOREIGN PATENT DOCUMENTS

| | | |
|---|---|---|
| JP | 2007-318879 | 12/2007 |
| JP | 2007 318879 A | 12/2007 |
| JP | 2007318879 | 12/2007 |
| JP | 2008-227325 | 9/2008 |
| JP | 2008 227325 A | 9/2008 |
| JP | 2008227325 | 9/2008 |

OTHER PUBLICATIONS

International Search Report and Written Opinion dated Jul. 30, 2010, PCT Patent Application No. PCT/US2010/035982, Filed May 24, 2010, Maxim Integrated Products, Inc.
Final Office Action dated Nov. 22, 2011, U.S. Appl. No. 11/767,400, filed Jun. 22, 2007, Mehmet Nalbant.
Notice of Allowance dated Feb. 7, 2012, U.S. Appl. No. 11/767,400, filed Jun. 22, 2007, Mehmet Nalbant.
Office Action dated Oct. 31, 2013, in related Chinese Patent Application No. 201010205779.2.
Office Action dated Jan. 27, 2014, in related Japanese Patent Application No. 2012-514979.
Office Action dated Jul. 17, 2014, in related Chinese Application No. 201010205779.2.
Office Action dated Oct. 7, 2014, in related Japanese Application No. 2012-514979.
Office Action dated Jan. 15, 2015, in related Chinese Application No. 201010205779.2.
Office Action dated Oct. 18, 2016, in Japanese Patent Application No. 2012-514979.
Office Action dated May 30, 2017, in Japanese Patent Application No. 2015-208566.
Office Action dated Jul. 30, 2015, in related Chinese Patent Application No. 201010205779.2 (38pgs).
Office Action dated Jun. 17, 2015, in related Japanese Patent Application No. 2012-514979 (3pgs).
Notice of Granting a Patent Right for Invention dated Dec. 7, 2015, in Chinese Patent Application No. 201010205779.2 (8pgs).

* cited by examiner

CIRCUIT TOPOLOGY FOR DRIVING HIGH-VOLTAGE LED SERIES CONNECTED STRINGS

RELATED APPLICATION

This application claims priority under 35 U.S.C. §119(e) of the U.S. provisional patent application Ser. No. 61/187,100, filed Jun. 15, 2009, and titled "Circuit Topology for Driving High-Voltage LED Series Connected Strings," which is hereby incorporated by reference.

FIELD OF THE INVENTION

This invention relates to electrical circuits. More specifically, this invention relates to backlights for televisions, computers, and other displays.

BACKGROUND OF THE INVENTION

Backlighting a television, computer, or other display allows a user to view the display in a dimly lit environment. Some current backlighting configurations use strings of light emitting diodes. FIGS. 1 and 2 show two such prior art configurations.

FIG. 1 shows a backlighting configuration 100 that includes two LED strings 101A and 101B, powered through a transformer 150. The remainder of the circuitry, described below, is used to turn the LED strings 101A and 101B ON and OFF, thereby controlling the brightness of the backlighting. Generally, a display will include more than two LED strings. FIGS. 1 and 2 both show only two LED strings merely to simplify the drawings.

In operation, the LED string 101A is illuminated by a current flowing through it. That current is determined by a voltage difference ΔV between its input and output. Transistor 105A is used to turn ON and OFF the LED string 101A and when transistor 105A is ON, the voltage at the bottom of the LED string 101A is approximately the same as the voltage at the top of resistor 110A. LED strings have the same brightness when they have the same current, but the voltage across the strings will vary from string to string. The regulator loop 120A regulates the current in the string 101A by monitoring the voltage on sense resistor 110A and then adjusting the voltage at the top of the string 101A until it is at the correct value for the string 101A to be at the correct current. In the example of FIG. 1, string 101A has $\Delta V = (220-V_A)$ VDC while string 101B has $\Delta V=(210-V_B)$ VDC, but the string currents are the same. The value of the resistor 110A determines the current through and thus the full brightness of the LED string 101A. During a single cycle, the longer the transistor 105A is ON, allowing current to flow through the LED string 101A, the brighter the effective illumination of the LED string 101A. For example, a 25% duty cycle results in the LED string 101A being illuminated to 25% of its perceived full brightness. A pulse width modulation (PWM) signal input to the transistor 105A controls the duration of the current through the LED string 101A, thereby adjusting its perceived brightness.

The control circuit 120A is part of a feedback loop for a Boost Regulator used to control the illumination of the LED string 101A. The control circuit 120A monitors the voltage drop on the sense resistor 110A and thus the current through the LED string 101A. The control circuit 120A is part of a Boost Regulator that controls the first voltage by adjusting a PWM duty cycle at the gate of the transistor 125A. This PWM frequency at the transistor 125A is independent of the PWM signal on the transistor 105A and is typically 1000 times higher in frequency.

To ensure sufficient voltage, the LED string 101A is coupled to a "boost circuit," which includes an inductor 135A, transistor 125A, and diode 130A that together boost the 115 VDC voltage from the top rail of a transformer secondary to produce the 220 VDC. The voltage divider 132A is used to monitor the Boost converter output in case of a fault condition such as an open LED string that would result in an over voltage condition.

FIG. 1 also shows other components on a non-isolated side of the transformer that powers the backlighting configuration 100, components such as a Bridge and Power Factor Correction element 161, a controller 165, and an opto-coupler 169. Because these components are ancillary to this invention, they will not be discussed here.

FIG. 2 shows a backlighting configuration 200 that differs slightly from the configuration 100. Whereas the configuration 100 uses multiple boost circuits (e.g., elements 125A, 130A and 135A, and elements 125B, 130B and 135B) each powering a separate LED string, the configuration 200 uses a single boost circuit (elements 125, 130 and 135) to power all the LED strings. In the configuration 200, the voltage at the bottom of the LED string 101A is controlled by adjusting the voltage at the gate of the transistor 105A.

It will be appreciated by those of ordinary skill in the art that multiple LED strings are typically used to backlight a display. For example, one LED string can be placed on each edge of a display. Alternatively, two LED strings can be placed along an edge of a display, such as a widescreen display.

The configurations 100 and 200 have many of the same components. Referring to FIGS. 1 and 2, identical labels refer to the same element. The figures are also simplified. For example, in FIG. 2 dots are shown to illustrate that some elements (e.g., additional LED strings and a controller similar to the amplifier 115A) are not shown.

The configurations 100 and 200 share several disadvantages. They both use high-voltage boost circuits, low-frequency inductors, and linear regulators, components that generate a lot of heat, are relatively expensive, and take up a large portion of a printed circuit board. Any mismatches between the diodes in the LED strings result in voltage differences across each current source, generating even more heat. Because high voltages are used, the regulation loop bandwidth is relatively limited.

Moreover, because the regulator circuit for controlling the current through each LED string is coupled to the high-voltage input, the components are required to withstand high-voltage conditions. As such, conventional controllers for backlight circuits are large and expensive.

SUMMARY OF THE INVENTION

In accordance with embodiments of the invention, a backlighting system includes a high-voltage source at one polarity at the top of LED strings and a low-voltage regulator at an opposite polarity at the bottom of the LED strings. The novel use of a low-voltage regulator allows smaller and less expensive components to be used to control the current through and thus the illumination of the LED strings.

In a first aspect of the invention, a backlighting system includes one or more LED strings, a high-voltage source, and a low-voltage regulator. The high-voltage source and the low-voltage regulator have opposite polarities and provide voltage differences across the LED strings to illuminate them.

In one embodiment, the backlighting system includes one or more LED strings, a high-voltage source, and a low-voltage Sink. The high-voltage source and the low-voltage Sink provide voltage differences across the LED strings to illuminate them. The low voltage Sink has a positive voltage and delivers power back to the system with a low voltage Boost topology that uses the bottom of the LED string as the input to the Boost and one of the system supplies, such as 12 V, as the output.

In one embodiment, the high-voltage source and the low-voltage regulator are coupled, respectively, to inputs and outputs of the LED strings. Preferably, a voltage of the high-voltage source is −5 to −20 times a voltage of the low-voltage source.

The system also includes one or more controllers and corresponding sample-and-hold circuits. Each of the controllers controls a current through one of the LED strings. Each of the sample-and-hold circuits couples the current sense voltage of one of the LED strings to one of the controllers.

The LED strings, the high-voltage source, and the low-voltage regulators form an open-loop system. Preferably, the system also includes a control block that, together with the low-voltage source and the high-voltage source, forms part of an adaptive loop that regulates the high voltage source to a level that keeps all of the low voltage regulators at the lowest possible voltage.

In a second aspect of the invention, an electronic device includes a display backlit by a backlighting system. The electronic device is a liquid crystal display (LCD) television, an LCD personal computer, or any other device that uses a backlit display. The backlighting system includes one or more LED strings, a high-voltage source, and a low-voltage regulator. The high-voltage source and the low-voltage regulator have opposite polarities and provide voltage differences across the LED strings, thereby illuminating them. The low-voltage regulator includes multiple control elements, each coupling the output of one of the LED strings to a low voltage.

In one embodiment, an absolute value of a voltage of the high-voltage source is at least 200 VDC, and an absolute value of a voltage on the low-voltage regulator is between 10 VDC and 30 VDC.

In a third aspect of the invention, a method of controlling the brightness of multiple LED strings includes sensing currents through the LED strings generated by voltage sources having opposite polarities. The currents are adjusted to maintain a brightness of the LED strings within a predetermined range. Preferably, the brightness is adjusted by adjusting the duty cycles of the LED strings while keeping the current in the LED strings constant when they are in the On condition of a PWM signal.

DETAILED DESCRIPTION OF THE DRAWINGS

In accordance with embodiments of the invention, a backlighting configuration uses a combination of a high-voltage source and a low-voltage regulator to properly illuminate LED strings. The embodiments are best suited for LEDs, such as those used to illuminate computer displays, Liquid Crystal Display television displays, and other displays.

Figure 3:
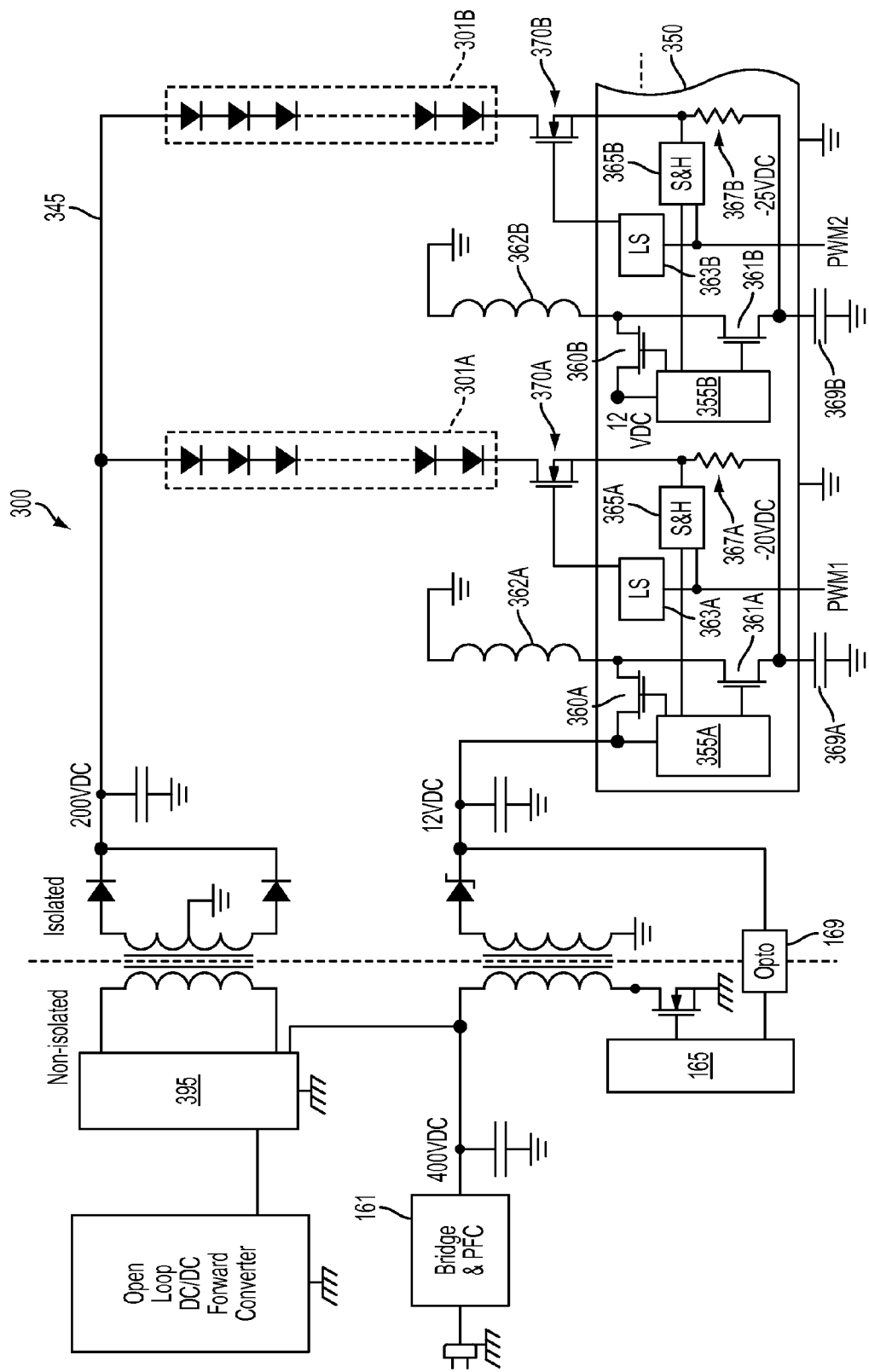
FIG. 3 shows a backlighting configuration according to one embodiment of the invention.

FIG. 3 shows a backlighting configuration 300 in accordance with one embodiment. The configuration 300 includes LED strings 301A and 301B, which backlight a display (not shown). The LED strings 301A and 301B are each coupled to a top voltage rail 345 at +200 VDC and a multiple low-voltage regulator 350 at a variable voltage, discussed below. The low-voltage regulator 350 controls the illumination of the LED strings 301A and 301B, advantageously using low voltages. This allows the regulator 350 to use low-voltage components.

The use of a low-voltage regulator 350 provides several advantages. First, because low-voltage swings are smaller than high-voltage swings, a low-voltage regulator can operate at higher frequencies. This limits the switching losses of a system and the EMI that it emits. Systems that have faster switching speeds also use transformers and inductors with smaller cores, components that are cheaper, that are smaller, and that generate less heat.

Though the configuration 300 shows only two LED strings 301A and 301B, it will be appreciated that displays generally include more than two LED strings. Some displays use six LED strings, two each on the top and bottom of the display, and one on each side. Of course, any number of LED strings configured any number of ways can be used to backlight a display.

Figure 1:
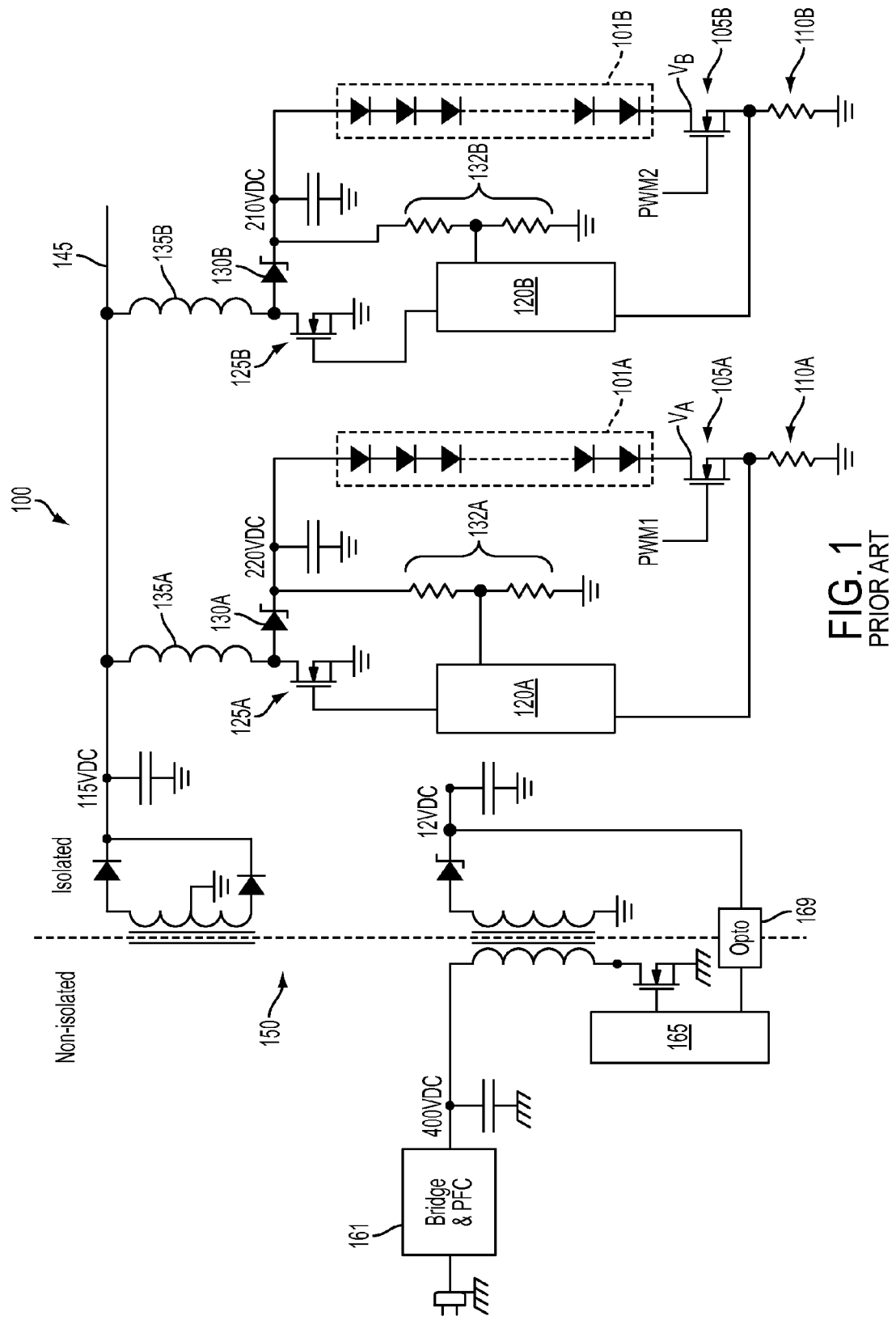
FIG. 1 shows a prior art backlighting configuration.
Figure 2:
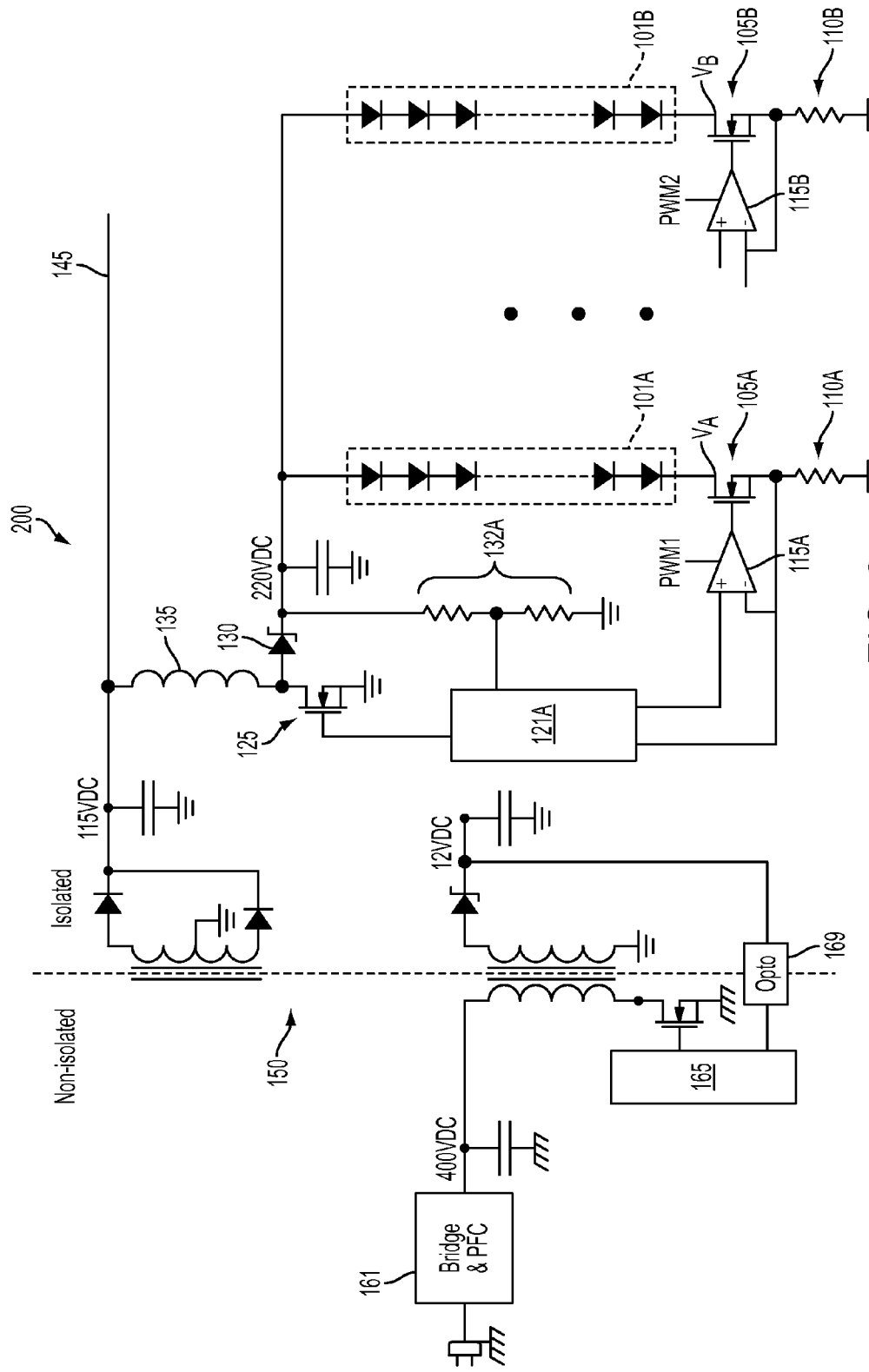
FIG. 2 shows another prior art backlighting configuration.

The low-voltage regulator 350 includes multiple low-voltage elements that each controls a separate LED string. Referring to FIG. 3, one low-voltage element, used to control the LED string 301A, includes a control circuit 355A, two transistors 360A and 361A, a level shifter 363A, a sample-and-hold circuit 365A, and a resistor 367A. To simplify the discussion that follows, only the low-voltage element that controls the LED string 301A is discussed. Other low-voltage elements operate similarly. Further, many of the components shown in FIG. 3 are found in the backlighting configuration 100 in FIG. 1 and are similarly labeled. These shared components are not discussed here.

In operation, the controller 355A turns ON the transistor 360A to energize the inductor 362A. The controller 355A then turns OFF the transistor 360A, which then allows the inductor 362A voltage to go negative, thereby turning ON the transistor (sync diode) 361A and charging the capacitor 369A. The DC voltage on the capacitor 369A is applied to the LED string 301A through the transistor (switch) 370A and the current sense resistor 367A. The voltage on the resistor 367A is used by the controller 355A to adjust the duty cycle of the transistor 360A, thus varying the voltage on the capacitor 369A. The capacitor 369A in one example generates anywhere between −5 VDC and −30 VDC, whatever voltage is needed to effectively illuminate the LED string 301A at the correct current.

The controller 355A monitors the current through the LED string 301A to maintain it at the correct illumination level by measuring the voltage drop across the sense resistor 367A at the base of the LED string 301A. Because the voltage is preferably pulsed to adjust perceived brightness, the controller 355A is coupled to the resistor 367A using a sample-and-hold circuit 365A so that it only senses current through the LED string 301A while the circuit 370A is active. The circuit 370A, which couples the base of the LED string 301A to the resistor 367A, is coupled to a pulse width modulation signal (PWM1) through a level shifting circuit 363A. Because the transistor 370A is not at the same level as its input logic circuits, the level shifter 363A is used to shift the voltage to an appropriate level. The controller 355A monitors the current in the resistor 367A using a feedback loop to ensure that the current in the LED strings (e.g., 301A and 301B) are the same.

The exemplary controller 355A is programmed to perform the steps discussed above, including monitoring the current through the LED string 301A and synchronizing the illumination level of the LED string 301A with the illumination levels of the other LED strings (e.g., 301B). In different embodiments, the controller 355A is programmed using a processor-readable medium containing executable instructions, using application-specific circuitry, using firmware, using any combination of these, or using other means known to those skilled in the art.

The configuration 300 has several advantages over the prior art. The low-voltage regulator 350 does not use any high-voltage transistors. The prior art requires 400 V boost transistors and 400 V diodes; the configuration 300 does not.

While FIG. 3 shows a single large positive (+200 VDC) supply voltage and multiple small negative (−20 VDC) voltages in the low-voltage regulator 350, it will be appreciated that a single large negative supply voltage can be used with multiple small positive voltages in the low-voltage regulator 350. In some embodiments, the supply voltage is a factor of −5 to −20 the voltage on the low-voltage regulator 350.

While FIG. 3 shows a single large positive (+200 VDC) supply voltage and multiple small negative (−20 VDC) voltages in the low-voltage regulator 350, it will be appreciated that a single large positive supply voltage can be used with multiple small positive voltage Sinks in the low-voltage regulator 350. In some embodiments, the high voltage supply voltage is a factor of −5 to −20 the voltage on the low-voltage regulator 350. The low voltage Sink can include a Boost regulator with the input and output reversed.

Embodiments use a single high-voltage supply and multiple low-voltage buck/inverting regulators to control the overall voltage of high-voltage current regulated LED strings. The embodiments eliminate the need to closed-loop regulate the high-voltage bus and eliminates the need for a linear current regulator loop. Because smaller inductors and output capacitors are used, the high-frequency low-voltage DC/DC converters are smaller and less expensive.

Figure 4:
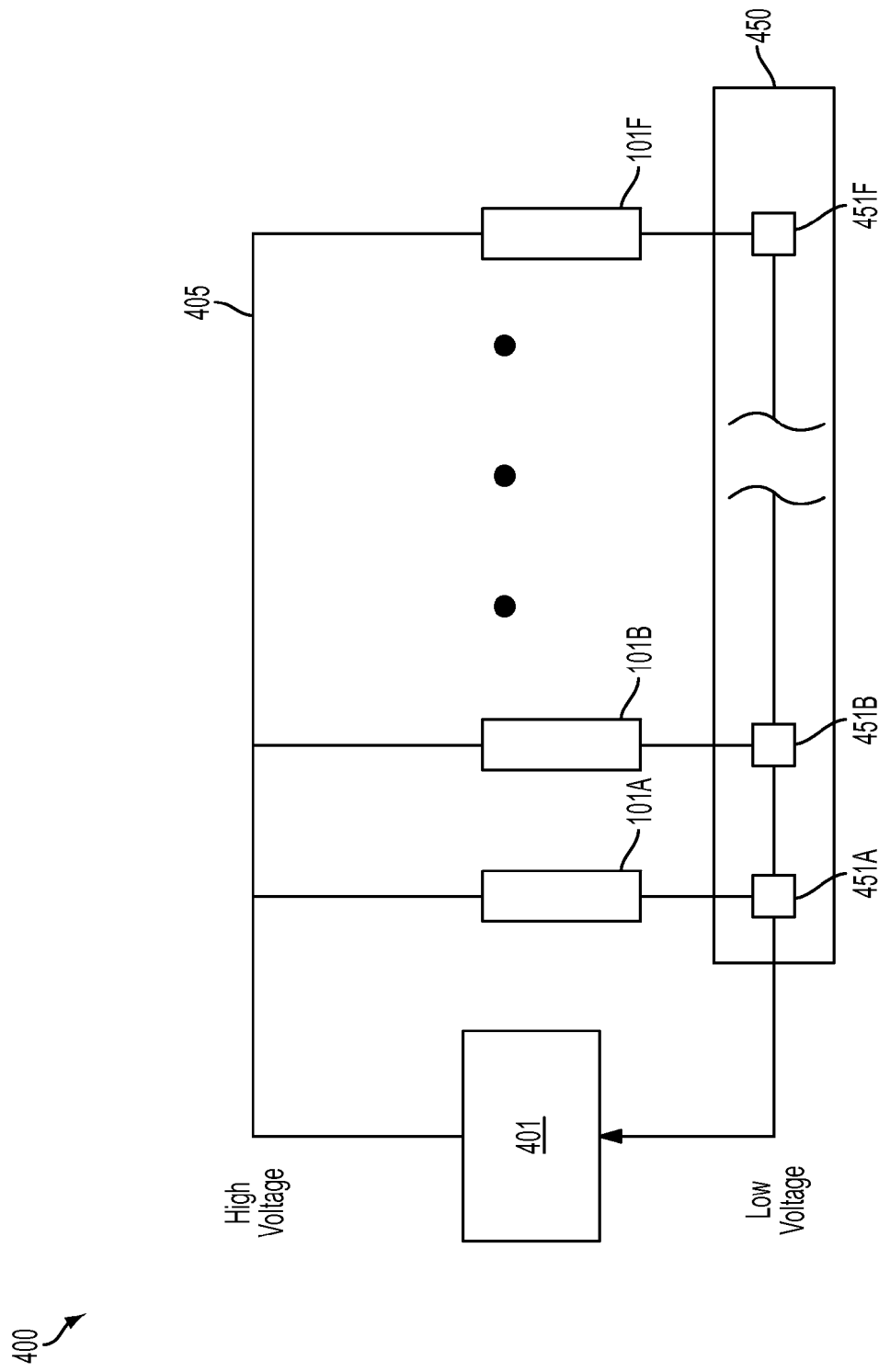
FIG. 4 shows a backlighting configuration according to another embodiment of the invention.

In accordance with other embodiments, a backlighting configuration is able to adapt to any number of different supply voltages. FIG. 4 shows a high-level diagram of a backlighting configuration 400 in accordance with one embodiment, using an adaptive system. The configuration 400 includes a top rail 405 of a voltage supply coupled to multiple LED strings 101A, 101B, and 101F, and a high voltage converter 401, all coupled to a low-voltage regulator 450, such as the low-voltage regulator 350 of FIG. 3. Each of the LED strings 101A, 101B, and 101F is coupled to a corresponding low-voltage element 451A, 451B, and 451F.

The top rail 405, the low-voltage regulator 450, and the High voltage converter 401 form an "adaptive loop." The low-voltage elements 451A, 451B, and 451F are coupled in series by cascaded wires. Each of the low-voltage elements 451A, 451B, and 451F transmits its voltage on the cascaded wires so that the smallest voltage is transmitted to the High Voltage converter 401. The High Voltage converter 401 uses this smallest value to determine the voltage on the top rail 405. For example, the High Voltage converter 401 determines the source voltage that will ensure sufficient illumination on all of the LED strings 101A, 101B, and 101F. In this way, the LED strings 101A, 101B, and 101F are illuminated to the right brightness, regardless of the voltage from the original voltage source.

Figure 5:
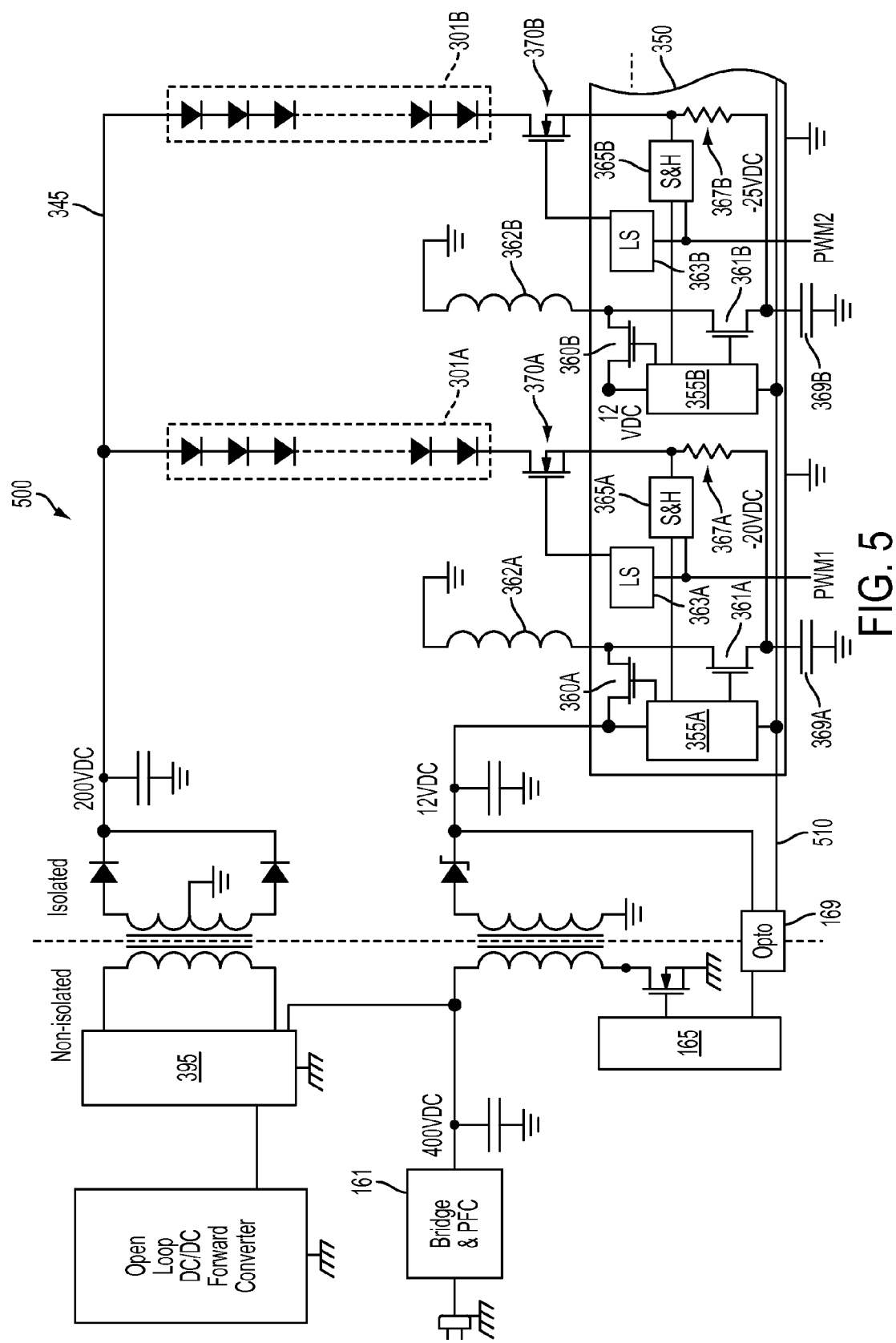
FIG. 5 shows a backlighting configuration according to still another embodiment of the invention, using an adaptive loop.

FIG. 5 shows a backlighting configuration 500 in accordance with one embodiment, employing an adaptive loop, such as discussed above in FIG. 4. The configuration 500 has many of the same components of the configuration 300; as in all the figures, similar labels refer to similar components.

In the configuration 500, the controllers 355A and 355B are coupled over the line 510 to each other, to the opto-controller 169, and to any other similarly functioning controllers (not shown) in a cascaded series. The smallest voltage (Vx) on the controllers (355A, 355B, etc.) is transmitted to the opto-controller 169, which uses this voltage to select the voltage on the top rail 345, thereby ensuring the proper illumination of the LED strings 301A and 301B.

In this embodiment, the configuration 500 includes multiple voltage sources (not shown) with different voltages for selectively coupling to the top rail 345. In the configuration 500, a 200 VDC source has been selectively coupled to the top rail 345. In other embodiments, when a different smallest voltage is transmitted to the opto-controller 169 (e.g., Vy<Vx), another of the multiple voltages is selectively coupled to the top rail 345 to illuminate the LED strings 301A and 301B to the proper brightness.

Those skilled in the art will recognize other ways to form an adaptive loop in accordance with embodiments of the invention.

In operation, backlighting LED strings are illuminated by generating voltage differences across them. The differences are generated by a high voltage across their inputs and regulated low voltages across their outputs. The high voltage and low voltages have opposite polarities. Advantageously, the backlighting circuitry includes small components that are relatively inexpensive and can operate at high frequencies.

It will be readily apparent to one skilled in the art that other modifications can be made to the embodiments without departing from the spirit and scope of the invention as defined by the appended claims.

I claim:
1. A backlighting system comprising:
one or more LED strings;
a high-voltage source;
one or more low-voltage regulators coupled in a feedback loop, the one or more low-voltage regulators have a polarity opposite that of the high-voltage source, the high-voltage source and the one or more low-voltage regulators provide voltage differences across the one or more LED strings to illuminate the one or more LED strings without a current source, the one or more low-voltage regulators are programmed to periodically couple outputs of the one or more LED strings to a controlled and variable low voltage.
2. The backlighting system of claim 1, wherein a voltage of the high-voltage source is a factor of −5 to −20 times a voltage of the controlled and variable low voltage.

3. The backlighting system of claim 1, further comprising one or more controllers each controlling a current through one of the one or more LED strings.

4. The backlighting system of claim 3, further comprising one or more sample-and-hold circuits each coupling an output of one of the one or more LED strings to one of the one or more controllers.

5. The backlighting system of claim 1, wherein the one or more LED strings, the high-voltage source, and the one or more low-voltage regulators form an open-loop system.

6. The backlighting system of claim 1, further comprising a boost converter, wherein the boost converter, the one or more low-voltage regulators, and the high-voltage source form an adaptive loop configured to generate a voltage on the high-voltage source from a smallest of the voltages from the one or more low-voltage regulators.

7. The backlighting system of claim 1, wherein the one or more low-voltage regulators and the high-voltage source form a closed adaptive loop to minimize the voltage on the one or more low voltage regulators.

8. An electronic device comprising:
a display; and
a backlighting system positioned to backlight the display, the backlighting system comprising:
one or more LED strings;
a high-voltage source;
a low-voltage regulator coupled in a feedback loop, the low-voltage regulator having a polarity opposite that of the high-voltage source, the high-voltage source comprises a DC voltage and is coupled to a controlled and variable DC voltage having a magnitude smaller than that of the DC voltage, the high-voltage source and the low-voltage regulator provide voltage differences across the one or more LED strings to illuminate the one or more LED strings without a current source.

9. The electronic device of claim 8, wherein an absolute value of a voltage of the high-voltage source is at least 100 VDC and an absolute value of a voltage on the low-voltage regulator is between 2 VDC and 30 VDC.

10. The electronic device of claim 8, wherein the one or more LED strings, the high-voltage source, and the low-voltage regulator form an open-loop system.

11. The electronic device of claim 8, wherein the electronic device is a liquid crystal display (LCD) television or an LCD personal computer.

12. A method of controlling the brightness of multiple LED strings comprising:
sensing currents through multiple LED strings generated by voltage sources having opposite polarities;
adjusting the currents to maintain a brightness of the LED strings within a predetermined range by periodically coupling outputs of the LED strings to controlled and variable low voltages generated by a low voltage regulator.

13. The method of claim 12, wherein adjusting the currents comprises adjusting duty cycles of the currents.

14. The method of claim 12, wherein an absolute value of one of the voltage sources is at least 100 VDC, and an absolute value of another of the voltage sources is between 2 VDC and 30 VDC.

15. The method of claim 14, further comprising adapting one of the voltage sources based on a voltage on another of the voltage sources to adjust the brightness of the multiple LEDs.

16. The method of claim 12, further comprising using the multiple LED strings to backlight a display of an electronic device.

17. The method of claim 16, wherein the electronic device is a liquid crystal display (LCD) television or an LCD personal computer.

18. The method of claim 12, wherein the multiple LED strings and the voltage sources form an open loop.

19. A backlighting system comprising:
one or more low-voltage regulators coupled in a feedback loop, the one or more low-voltage regulators have a polarity opposite that of a high-voltage source for powering one or more LED strings without a current source, the one or more low-voltage regulators control a low-voltage source to provide voltage differences across the one or more LED strings to illuminate the one or more LED strings, and the one or more low-voltage regulators are programmed to periodically couple outputs of the one or more LED strings to one or more controlled and variable low voltages.

20. The backlighting system of claim 19, further comprising one or more controllers each for maintaining a current through one of the one or more LED strings within a predetermined range.

21. The backlighting system of claim 20, further comprising one or more sample-and-hold circuits each for coupling an output of one of the one or more LED strings to one of the one or more controllers.

22. The backlighting system of claim 19, wherein a voltage of the high-voltage source is a factor of −5 to −20 times a voltage of the low-voltage source.

23. The backlighting system of claim 20, wherein each of the one or more controllers is also configured to charge a capacitor through an inductor to generate a voltage applied to a corresponding one of the one or more LED strings.

24. The backlighting system of claim 19, wherein the one or more LED strings and the one or more low-voltage regulators are for forming an open-loop system with the high-voltage source.

25. The backlighting system of claim 19, further comprising a boost converter, wherein the boost converter and the one or more low-voltage regulators are for forming an adaptive loop with the high-voltage source.

26. The backlighting system of claim 19, wherein the one or more low-voltage regulators are for forming an adaptive loop with the high-voltage source to minimize voltages on the one or more low-voltage regulators.

27. The backlighting system of claim 19, wherein the one or more LED strings are for backlighting a display of an electronic device.

28. The backlighting system of claim 27, wherein the electronic device is a liquid crystal display (LCD) television or an LCD personal computer.

29. A current regulator comprising:
a low-voltage regulator coupled in a feedback loop, the low-voltage regulator is configured to monitor a first voltage to top segments of one or more LED strings and to supply a set of controlled and variable voltages to bottom segments of the one or more LED strings without a current source, the first voltage and the set of controlled and variable voltages have opposite polarities, and voltages in the set of controlled and variable voltages are different from each other.

30. The current regulator of claim 29, wherein the voltage regulator comprises one or more controller units each coupled to a corresponding one of the one or more LED strings, wherein each controller unit is programmed to control a current through one of the one or more LED strings.

31. The current regulator of claim 30, wherein each of the multiple controller units comprises a capacitor and inductor pair and is configured to charge the capacitor through the inductor to a negative voltage according to a predetermined duty cycle.

32. The current regulator of claim 31, wherein each of the multiple controller units further comprises a sense resistor that is coupled to a bottom of one of the one or more LED strings.

33. A backlighting system for a display, the system having a high-voltage source coupled to a first end of one or more LED strings, the system comprising:
  one or more low-voltage regulators coupled in a feedback loop, the one or more low-voltage regulators have a polarity opposite that of the high-voltage source and coupled to a second end of the one or more LED strings, the one or more low-voltage regulators are programmed to periodically couple a controlled and variable low-voltage source to the one or more LED strings to provide voltage differences across the one or more LED strings without a current source.

* * * * *